E. E. WICKERSHAM.
CONSTRUCTION FOR TRACTION ENGINES.
APPLICATION FILED NOV. 5, 1918.

1,395,024.

Patented Oct. 25, 1921.
6 SHEETS—SHEET 1.

Inventor.
Elmer E. Wickersham
By Strong & Townsend
Attys

E. E. WICKERSHAM.
CONSTRUCTION FOR TRACTION ENGINES.
APPLICATION FILED NOV. 5, 1918.

1,395,024.

Patented Oct. 25, 1921.
6 SHEETS—SHEET 2.

Inventor
Elmer E. Wickersham
By Strong & Townsend
Attys

E. E. WICKERSHAM.
CONSTRUCTION FOR TRACTION ENGINES.
APPLICATION FILED NOV. 5, 1918.
1,395,024.
Patented Oct. 25, 1921.
6 SHEETS—SHEET 3.
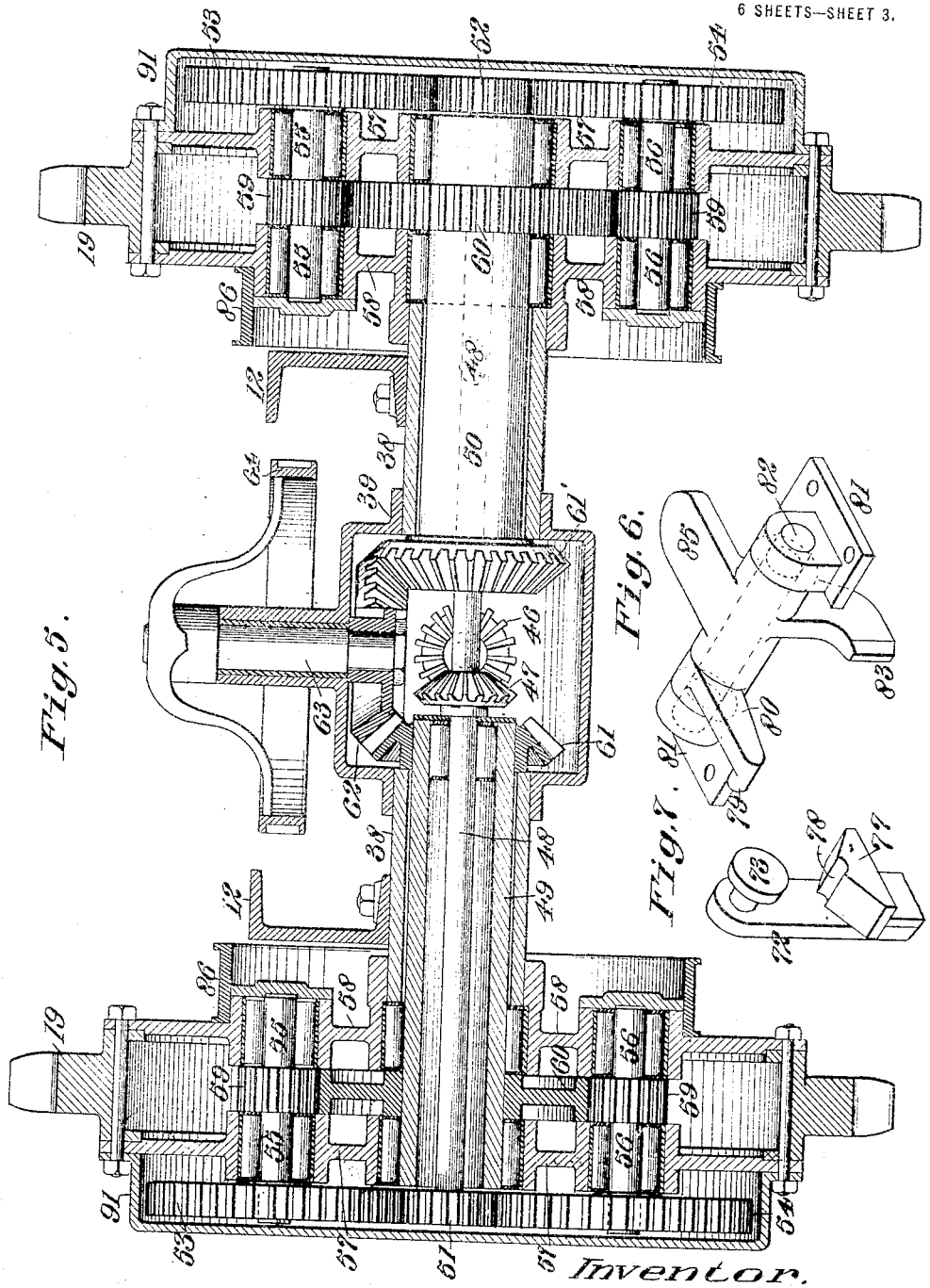
Inventor.
Elmer E. Wickersham
By Strong & Townsend
Attys

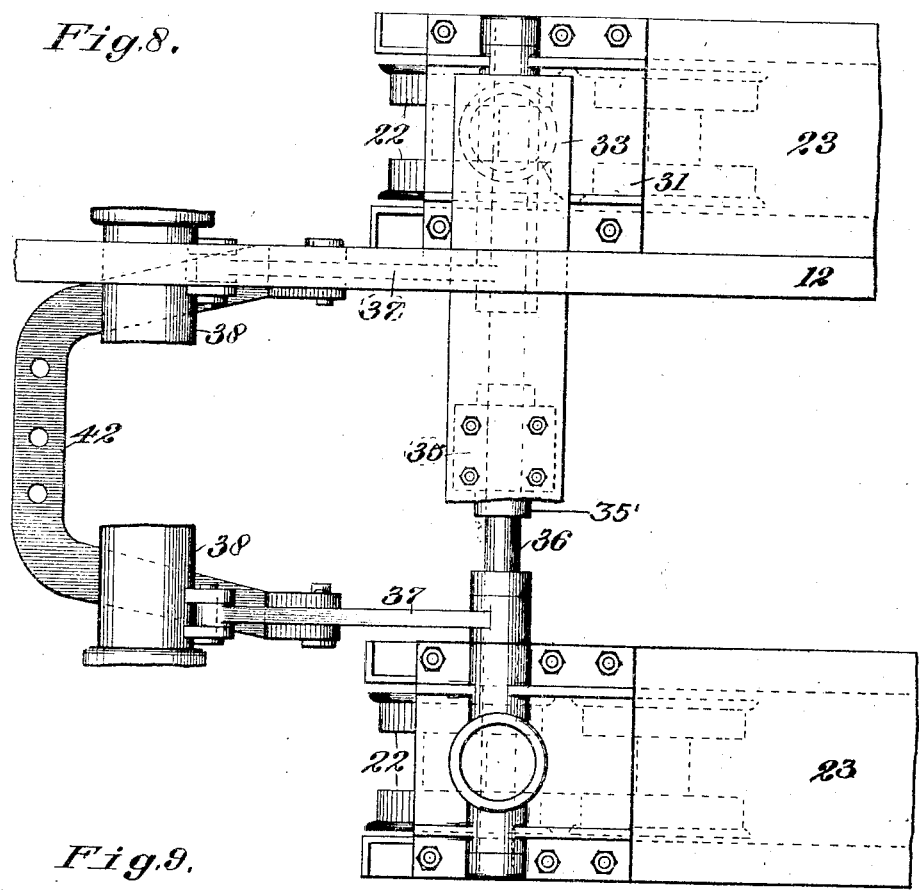

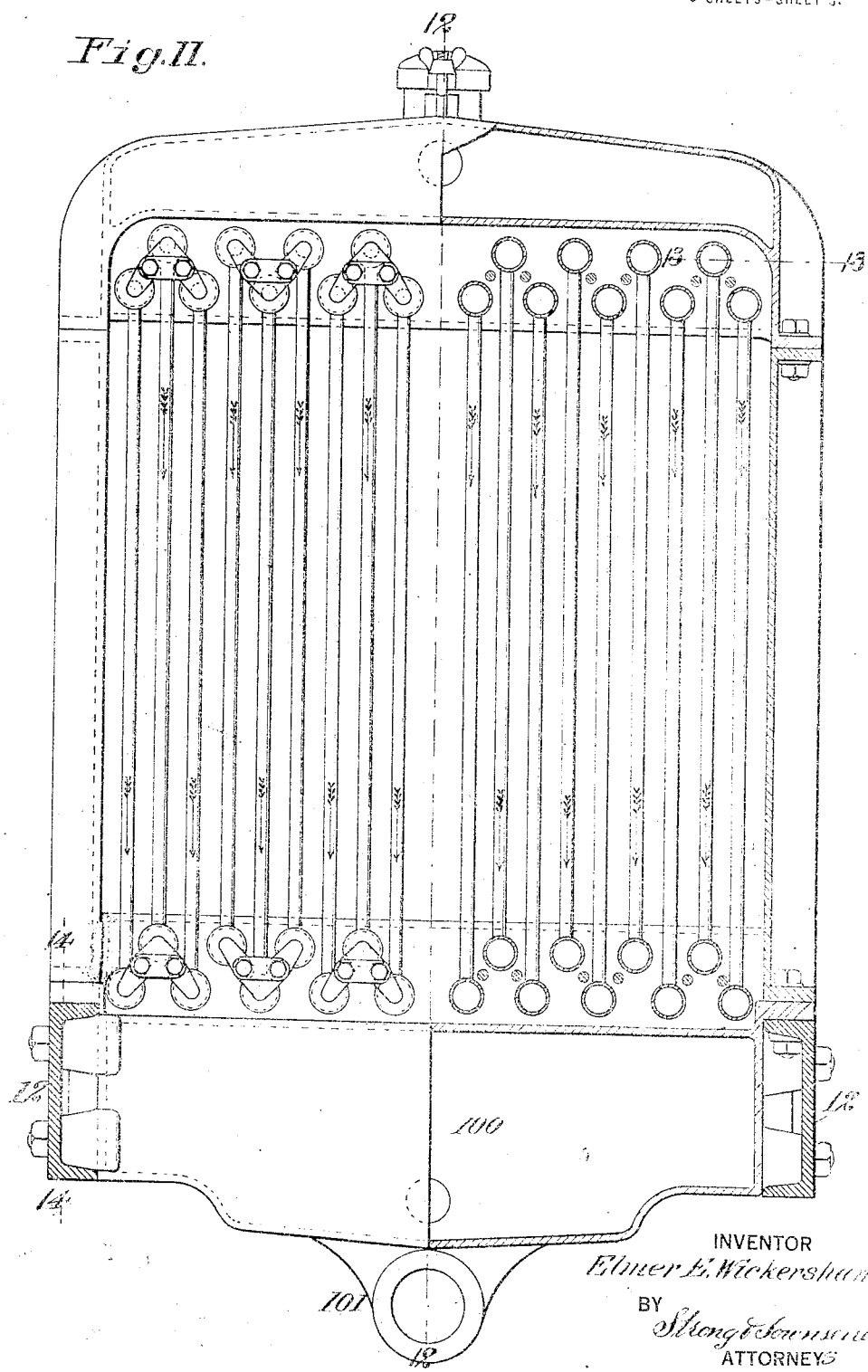

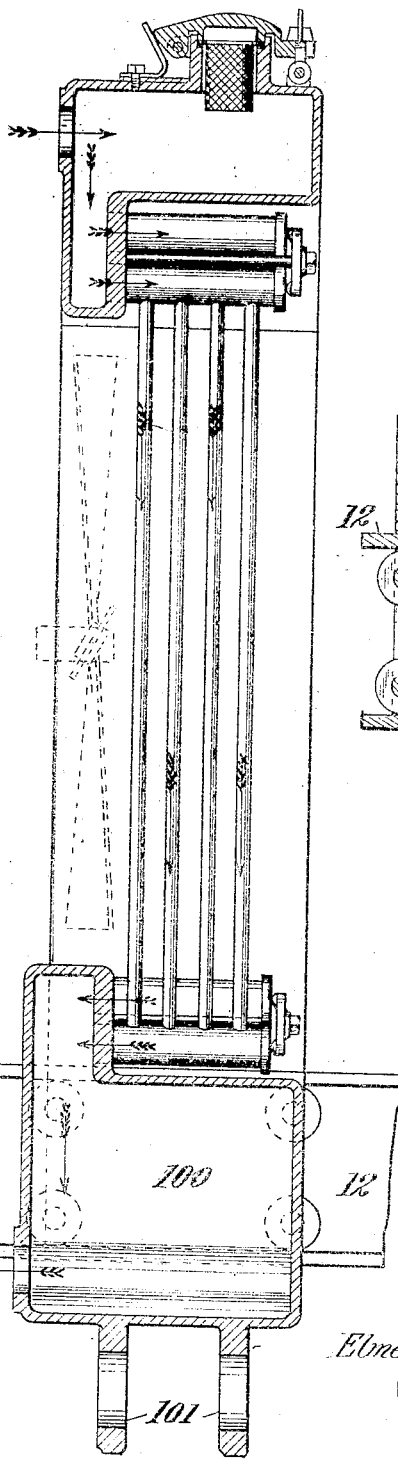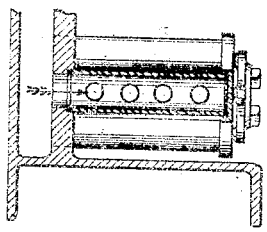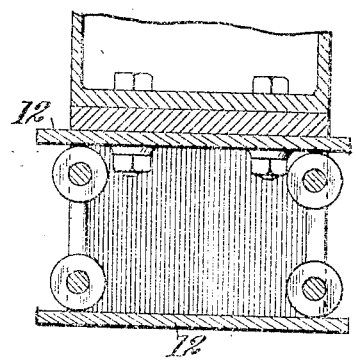

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

CONSTRUCTION FOR TRACTION-ENGINES.

1,395,024.

Specification of Letters Patent.  Patented Oct. 25, 1921.

Application filed November 5, 1918. Serial No. 261,176.

*To all whom it may concern:*

Be it known that I, ELMER E. WICKERSHAM, a citizen of the United States, residing at Stockton, in the county of San Joaquin and State of California, have invented a new and useful Improvement in Construction for Traction-Engines, of which the following is a specification.

It is the principal object of this invention to provide a tractor, the construction of which is especially adapted for heavy duty vehicles and the elements of which machine afford desirable means for flexibly supporting the tractor main frame upon the self-laying track units with which the vehicle is provided, and a transmission mechanism by which the track units may be driven as desired, to effect the steering operation of the vehicle, the parts of said mechanisms being simple in their design and construction, readily manufactured, and when assembled, easily operated.

The present invention contemplates the use of a rigid main frame, at the opposite sides of which are disposed self-laying track units upon which the main frame in the present instance is supported by a three-point suspension mechanism. The main frame carries a power plant and a complete transmission unit by which variable speeds of rotation may be imparted to the traction units, as controlled by a single steering shaft. The tractor construction also provides a novel connection between the main frame and the truck frames, whereby a maximum tractive effort will be obtained from the track elements of the vehicle when a trailer is connected to the draw bar.

Fig. 5 is a view in longitudinal vertical section, as seen on the line 5—5 of Fig. 3, illustrating the complete axle construction of the driving sprockets of the track units.

Fig. 6 discloses one of the elements of the steering mechanism, as seen in perspective.

Fig. 7 illustrates another of the elements of the steering mechanism which coöperates with the device shown in Fig. 6.

Fig. 8 is a fragmentary view in plan, illustrating the manner in which the draw bar is connected to the tractor.

Fig. 9 is a view in side elevation, disclosing the subject matter shown in Fig. 7 and more clearly indicating the manner in which the draw bar is fastened to the tractor construction.

Figure 4:
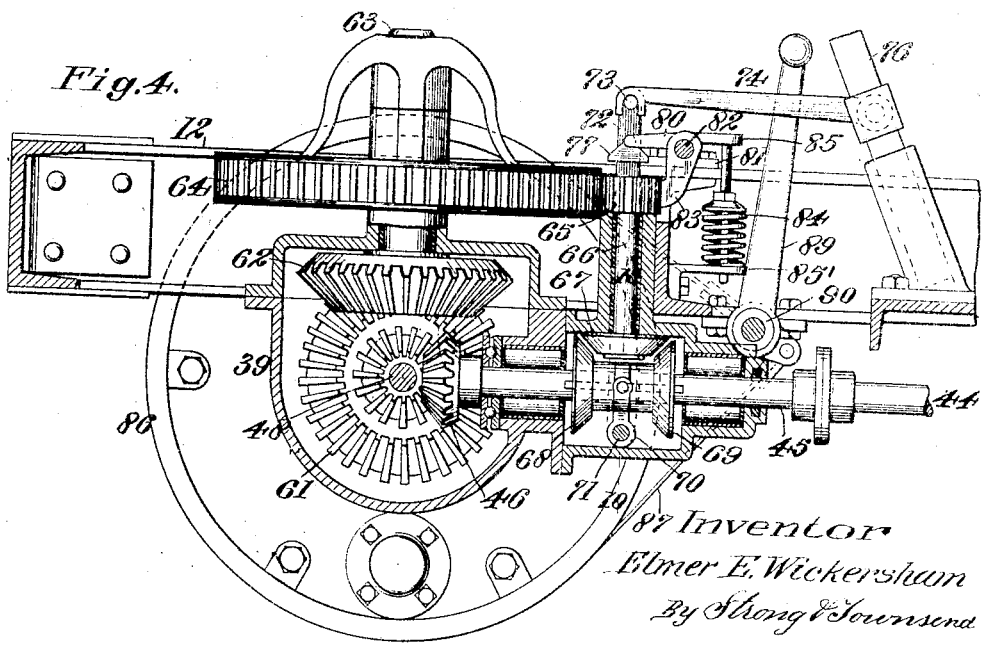
Fig. 4 is a view in vertical section, as seen on the line 4—4 of Fig. 3, disclosing in detail the steering mechanism by which the separate traction units of the vehicle may be affected to rotate at relatively variable rates of speed.

Fig. 10 is a view in vertical section, as seen on the line 10—10 of Fig. 4, disclosing the steering clutch members.

Fig. 11 shows a front elevation partly in section of the radiator and its mounting.

Fig. 12 shows a sectional view of the radiator taken on the line 12—12 of Fig. 11;

Fig. 13 shows a detail sectional view taken on the line 13—13 of Fig. 11;

Fig. 14 shows a detail sectional view taken on the line 14—14 of Fig. 11.

In the drawings, 10 indicates a power plant which preferably includes an internal combustion engine operatively connected with a speed changing gear 11. The gear set and engine are provided with suitable hangers by which they may be mounted upon a main frame 12 and this frame is built, as usual, of structural members providing parallel side rails and lateral end rails. A suitable sheet metal hood 13 is mounted upon these rails and properly incloses the entire power plant. At the rear of the main frame a seat 14 is provided for the use of the driver. This seat is fitted with a suitable canopy 15 which affords a shelter and extends outwardly over the operating mechanism for the control of the vehicle and a steering hand wheel 16. This wheel is mounted at the upper end of a steering column 17 and when operated, performs novel functions which will be hereinafter set forth.

The main frame, with its related parts, is carried by self-laying track units disposed at the opposite sides thereof. These units each include a rear driving sprocket 19 and a front idler wheel 20. The sprocket and wheel at each side of the vehicle are in longitudinal alinement and are embraced by an articulate track 21 adapted to travel along the ground and perform a temporary rail for load supporting rollers 22. These rollers are arranged in a series interposed between the sprockets and idlers. Roller truck frames 23 are provided and carry suitable bearing boxes for the spindles of the rollers, as clearly shown in Fig. 1.

The forward ends of the truck frames are forked to form a suitable support for a bearing 24, within which the axle of the idler wheels is mounted. The bearing 24 is mounted to slide longitudinally of the truck frames 23 and is adjustably held in relation to a standard 25 by means of a tension bolt 26. The inner arms of the truck frames are each provided with a bracket 27, carrying a pin 28. These pins extend through the outer eyes of a spring equalizer member 29, as clearly shown in Fig. 2. The member 29 extends transversely of the main frame 12 and is pivoted along the longitudinal axis of this frame by a horizontally extending pivot bolt 30. By means of this spring and the connections described, the forward ends of the truck frames are yieldably connected to the main frame. The rear ends of the truck frames are provided with spring seats 31 upon which coil springs 32 are mounted. These springs are interposed between the seats 31 and outrigger members 33 carried at the opposite sides of the main frame and slightly in front of the driving sprockets 19.

It will thus be seen that the main frame will be resiliently supported at all points in relation to the truck frames. The outriggers 33 are formed by the ends of a cross-beam 34 which is bolted beneath the main frame and which carries a pair of downwardly extending hangers 35. These hangers are formed with an enlarged slotted opening in their lower ends to accommodate a transverse bridle rod 36 which is pivotally connected through each of the spring seats 31, as shown in Fig. 8. The opening in the hanger 35, through which this rod extends, allows it to have limited movement in relation thereto.

Fixed to the trucks are equalizer bars 37 which are pivoted by their forward ends to the trucks and by their rear ends to housing members 38 of the rear axle transmission case 39. These housing members are tubular and are provided with bolting pads through which they may be directly secured to the side rails of the main frame. The radius rods 37 are formed between their ends with downwardly extending lugs 40 which carry pivot pins 41, engaging the forward ends of a U-shaped draw bar 42. This bar extends rearwardly beneath the rear axle housing and may be suitably engaged by a trailer and will act upon the thrust rods when subjected to a load to swing the forward end of the rods downwardly and rearwardly and thus dispose a percentage of the load of the trailer upon the rear ends of the track rollers, thus increasing the pressure of these rollers upon the track and insuring that greater tractive effort may be made by the tractor without slipping. The engine of the power plant 10 is adapted to drive an engine shaft 43 which is provided with a series of shiftable gears adapted to be brought to mesh as desired, with other complementary gears upon a jack shaft 44 and thereby to vary the speed of rotation of the engine shaft in relation to the jack shaft. The jack shaft extends rearwardly through a bearing in the transmission case housing and is coupled to a propeller shaft 45. This shaft is rotatably supported within bearings at the front end of the axle transmission case 39 and is provided at its rear terminating end with a bevel driving gear 46. The gear 46 is in constant mesh with a complementary gear 47 fixed to the rear axle 48. The axle 48 extends continuously through the transmission housing 39 and its opposite ends are inclosed within sleeves 49 and 50, these sleeves extending through the tubular portions 38 of the housing. Anti-friction bearings are positioned within these sleeves to rotatably support the axle and to allow relative motion between the axle and the sleeves without binding. The outer ends of the axle are provided with spur gears 51 and 52 which are keyed to the axle and are in constant mesh with diametrically disposed planetary spur gears 53 and 54. The planetary gears 53 and 54 are carried upon their separate spindles 55 and 56. These spindles are supported in the separate halves 57 and 58 of a planetary gear spider. Hubs are formed upon these halves, receiving anti-friction bearings by which the spider may be rotatably mounted upon the outer ends of the sleeves 49 and 50.

As a desirable feature of design, the spider carries anti-friction bearings for receiving the spindles 55 and 56. The spider members 57 and 58 are spaced in relation to each other to accommodate spur gear pinions 59 which are fixed upon the spindles 55 and 56 and which in turn are in constant mesh with controlling gears 60, one of which gears is fixed upon each of the sleeves 49 and 50. The inner ends of the sleeves 49 and 50 terminate slightly within the main gear box of the case 39. Here they are fitted with bevel gears 61 and 61', secured upon the sleeves 49 and 50 respectively. These gears are keyed to the sleeves and are in constant mesh with a common driving gear 62, carried by a vertical shaft 63. This shaft extends upwardly through bearings in the top of the gear box and is fixed at its upper end to a large horizontally disposed spur gear 64.

From the foregoing description, it will be evident that rotation of the spur gear 64 in either direction, will produce a slight rotation of the bevel gear 62 and will thus cause the gears 61 and 61' and their sleeves to rotate in opposite directions at equal speeds. This action is provided to produce a differential driving action of the spiders and to thus impart a desired speed of rotation to the driving sprockets 19 which are bolted to the outer circumferences of the spiders. In order that the movement of the gear 64 shall be positive, it is power driven by means of the shaft 45. This is accomplished by a small spur gear 65 which is splined to a vertical shaft 66 carried in the housing 39. Upon the lower end of this shaft is fixed a friction gear 67 interposed between friction gears 68 and 69. These members are permanently united by a hub and are splined to the shaft 45. In order that the shaft 66 may be rotated in either direction, it is necessary to bring one of the friction gears 68 or 69 into frictional contact with the surface of the friction gear 67. This is done by a shifting yoke 70 mounted upon a pivot bolt 71 in the bottom of the transmission case. Fixed at the outer end of this bolt is a vertically extending shifting lever 72 which is of considerable length and carries a pin 73 at its upper end. The pin 73 normally rests within an inverted U-shaped recess in a control arm 74 which extends forwardly and is pivoted for vertical movement in relation to a lug 75, fixed to the side of the steering shaft 76 inclosed within the column 17. The hand wheel 16, previously mentioned, is fixed to the upper end of this shaft.

The lever 72 is formed with a stop lug 77, as clearly shown in Fig. 7. This lug has oppositely diverging faces which terminate at their contiguous edges in an arcuate recess 78. The recess 78 is provided to receive a stop pin 79 carried upon the side of a lock lever 80. This lever is pivotally mounted upon brackets 81 by means of a pin 82, and is fixed integral with a locking finger 83. This finger swings pivotally and may be brought to register between the teeth of the pinion 65. By this means, the pinion 65 and the gear 64 may be locked against motion when desired. An expansion spring 84 is positioned to bear upwardly against a pressure arm 85 formed as an integral part of the lock member 83 and normally acts to hold the finger 83 out of contact with the teeth of the gear 65. The lower end of the spring 84 is seated upon a bracket 85' fixed to the transmission case of the tractor.

Figure 3:
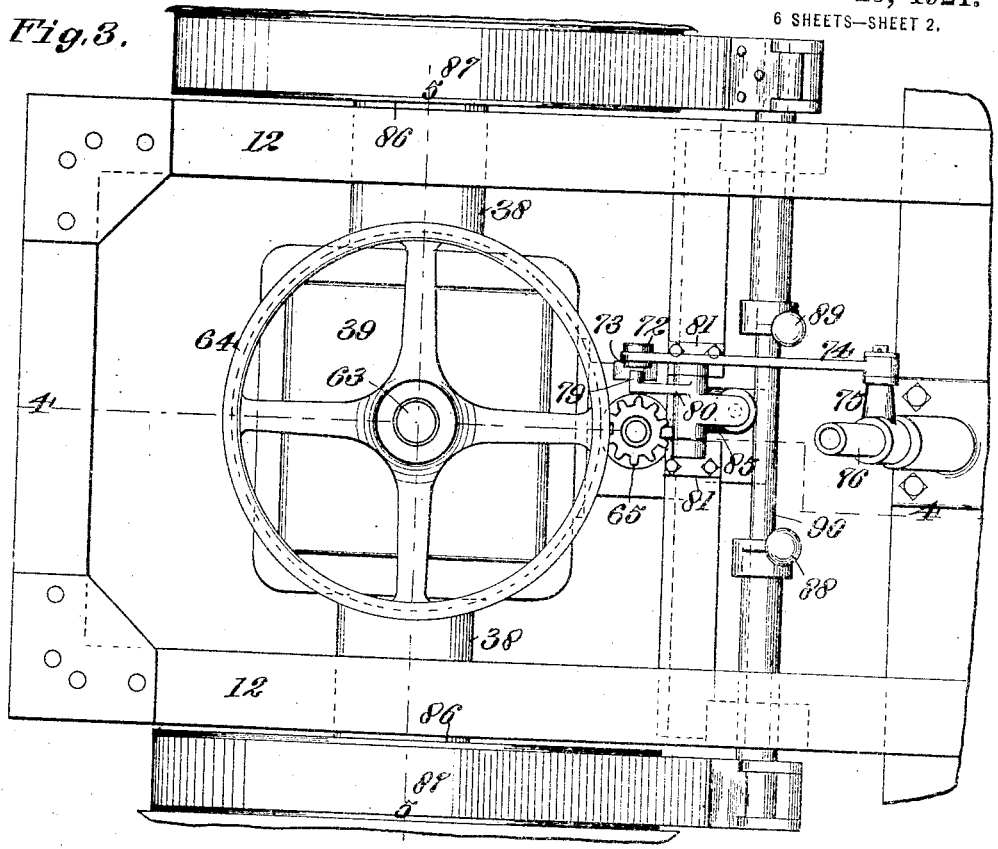
Fig. 3 is a view in plan, illustrating the power transmission structure disposed at the rear of the main frame and with parts broken away for the sake of convenience.

As shown in Fig. 5 of the drawings, the complementary spider members 57 and 58 are bolted to the opposite sides of a ring carrying a sprocket 19. The inner of these spider members is fitted with a brake ring 86 which circumscribes the bearings of the spindles 55 and provides a suitable braking member for brake bands 87, which bands are adapted to be actuated by their respective brake levers 88 and 89, mounted upon a non-rotatable shaft 90. This shaft extends across the main frame as shown in Fig. 3. The outer spiders 57 of the wheels are covered by gear housings 91 which entirely conceal the gears 51, 52, 53 and 54.

Figures 1, 2:
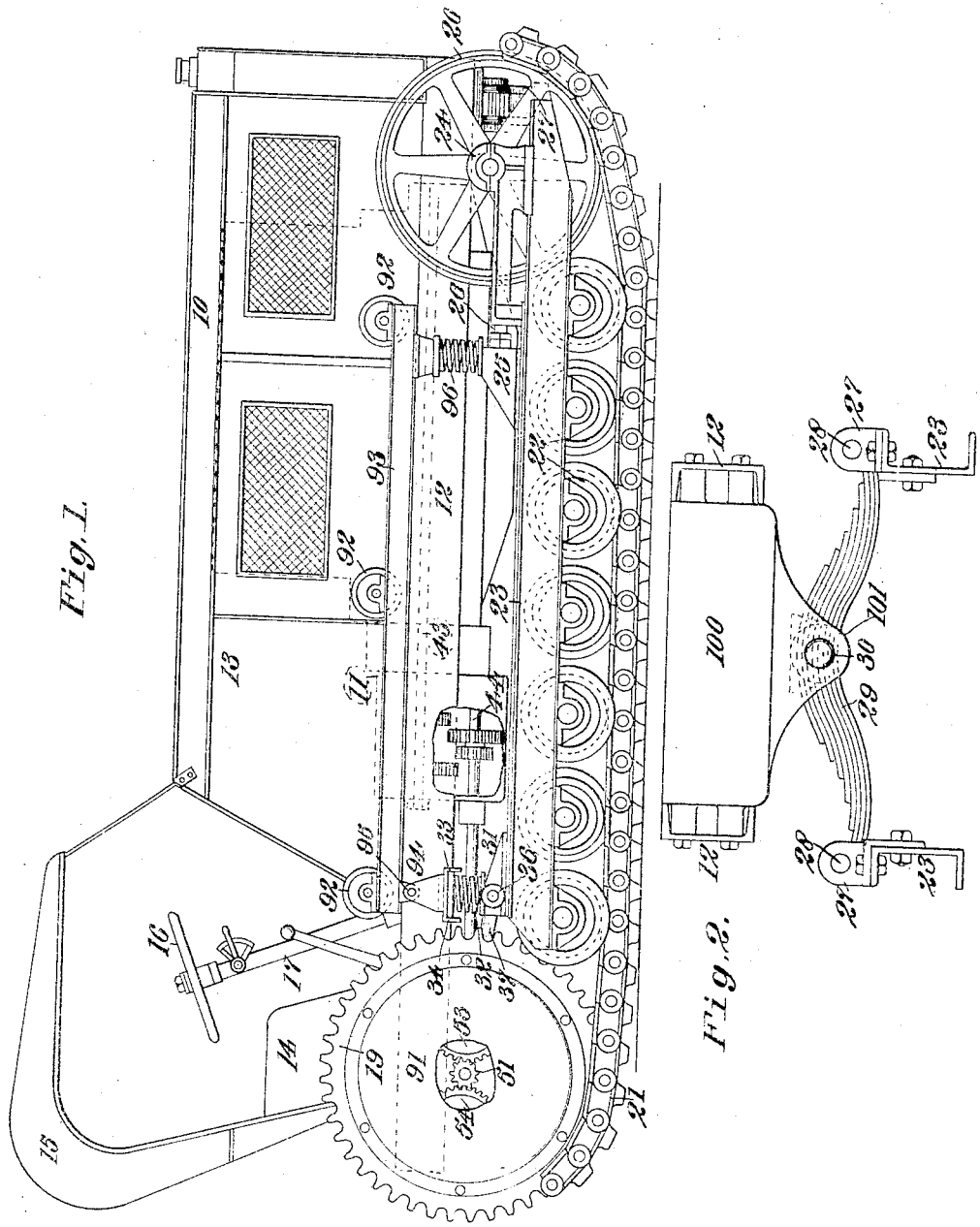
Figure 1 is a view in side elevation, illustrating the completely assembled tractor with parts broken away to more clearly disclose its details of construction.
Fig. 2 is a fragmentary view and front elevation, illustrating the resilient equalizer bar by which the forward ends of the track truck frames are connected to the main frame.

Reference being had to Fig. 1, it will be seen that idler rollers 92 are provided to support the upper run of the track chains. These rollers are mounted upon rails 93, the rear ends of which are pivotally secured to the main frame by brackets 94 and pins 95. The forward ends of the rails are yieldably supported from the trucks 23 by means of expansion springs 96. This insures that the rails will be allowed to yield and that relative movement of the trucks in relation to the main frame will permit the rails to properly actuate the change in position and tension of the tracks and to constantly support the upper run thereof at all times.

When excessive draw bar loads are applied to the tractor, it often occurs that the forward end of the tractor will have a tendency to rise from the ground. To offset this action, a radiator of peculiar design is provided. This radiator is particularly shown in Figs. 11—12—13—14. The lower portion of the radiator is formed with an enlarged water compartment 100, which extends between the side rails of the main frame and is fitted with lugs at the opposite sides thereof, by which the main frame may be secured thereto. As shown in Fig. 11, it will be seen that the lower part of the radiator completely fills the space between the side rails and when bolted in position will eliminate the use of a front cross rail in the main frame, at the same time being provided with downwardly extending hangers 101, through which the pin 30 of the equalizer bar 29 extends. The lower compartment of the radiator is of considerably greater width than the thickness of the radiator and thus provides a large container for water, which not only increases the capacity and efficiency of the radiator but also applies a load to the forward end of the main frame, which will exert a downward pressure to hold the vehicle on the ground.

In practice, the tractor is assembled as shown in Fig. 1 and as it moves along its course of travel, the main frame will be supported upon the truck frames by means of a resilient equalizer member 29 which extends across the forward and freely moving ends of the truck frames and the springs 32 are interposed between the rear ends of the truck frames and the main frame. Due to the construction of the block 35, the stabilizing shaft 36, by which the rear ends of the trucks 23 are pivotally connected, may have limited vertical and horizontal movement without having lateral movement, this lateral movement being eliminated by the use of collars 35', positioned at the opposite sides of the member 35 and between which said member may slide. The movement of the rear end of the trucks in relation to the main frame will be controlled by the thrust rods 37 which pivotally connect the truck frames to the main frame, as shown in Fig. 4. In this connection, it is to be noted that the pivotal connections of the thrust rods are not in horizontal alinement and that the forward pivot is lower than the rear pivot. As the tractor moves, the separate trucks 23 may swing vertically from the stabilizing shaft 36 and at the same time may move bodily in a vertical direction against the action of the springs 32. A limited longitudinal movement may also be effected, due to the lost motion between the shaft 36 and the block 35, as controlled by the radial movement of the thrust rods 37. As the forward end of the main frame is pivotally and yieldably supported from the two trucks, it will be seen that the truck units may have a desired independent movement in relation to each other and that the main frame will be supported in a position to eliminate the greater portion of vibration and distortion, due to the inequalities in level of the two truck units and their positions in relation to each other and the main frame.

When a trailer is connected to the tractor, the draw bar 42 is used. As the thrust rods 37 incline forwardly and downwardly, and as the pivotal connection between the draw bar and these rods is at a point between the two pivoted ends of the thrust rods, the rear pivot of the thrust rods will be established as a fulcrum point and the pulling action against the draw bar will act to swing the thrust rods downwardly and exert a force by their forward ends against the rear ends of the truck frames 23. This action will cause a part of the draw bar load of the trailer to be transferred to the load supporting rollers of the truck and to there exert a downward pressure on the chain, whereby additional tractive effort may be produced and a heavy trailer pulled without the usual danger of slippage of the tractor.

Assuming that the vehicle is pursuing a straight path of travel, it will be understood that the gears 64 and 65 will be locked against rotation by means of the lock finger 83, as held by the spring 84. This lock finger will be maintained in its locking position while the pin 79 of arm 80 is in register with the recess 78 of the lug 77. By turning the hand wheel 16 to the right, the steering shaft 76 will be rotated and will swing the connecting member 74 forwardly. This will cause the lever 72 to swing forwardly and will draw the lug 77 from its supporting position beneath the pin 79. Continued swinging motion of the lever 72 will cause the yoke 70 to draw the friction gear 68 against the face of the clutch member 67. As the friction gears 68 and 69 are constantly rotating with the shaft 45, rotation will thus be imparted to the vertical shaft 66 and thereafter will cause the gears 65 and 64 to rotate in unison. By this means, vertical shaft 63 will be rotated and this shaft in turn will act through the bevel gears 62, 61 and 61', to rotate the sleeves 49 and 50 in opposite directions. As these sleeves carry gears 60, the gears 59 upon the spindles 55 and 56 will be rotated. Normally, the gears 60 were held against rotation by the locking action of the finger 83 and at that time the constant driving action of the pinions 51, 52, actuated the gears 53 and 54 as well as the gears 59. The actuation of the gears 59 caused the sprockets 19 to be driven at a lower rate of speed than the speed of rotation in the axle, as a gear reduction would be effected through the gears 51, 52, 53, 54, and 59.

It will thus be evident that when the gears 59 are positively driven by motion of the normally non-rotating gears 60, a variation in the speed ratio between the sprocket and the axle will be effected. In the present instance, one sprocket will be accelerated while the other one will rotate at a speed less than its normal speed. This will cause the vehicle to turn, as will be understood. When it is desired to again follow a straight course of travel, the steering column is turned to draw the lever 72 at a directly vertical position, at which time the spring 84 will cause the pin 79 to register with the recess 78. The lever 72 will therefore withdraw the friction gear 68 from engagement with the friction gear 67 and will incidentally permit the finger 83 to register between the teeth of the gear 65, thus locking the gears 64 and 65 against rotation and positively holding the sleeves 49 and 50 so that the original gear ratio will be established between the driving axle 48 and the two sprockets 19. It is also to be noted in this connection that there will be no differential action between the two sprockets under normal conditions and that both chains will be positively driven at predetermined speeds, thus insuring that irregularities in the roadway or obstructions will not cause one or the other of the tracks to accelerate in speed but will cause them to continue in describing a straight or an arcuate course of travel, as desired.

Having thus described my invention, what

I claim and desire to secure by Letters Patent is—

1. In a tractor, a main frame, track laying mechanism at each side thereof, each track laying mechanism including a roller truck frame, a stabilizer shaft connecting the rear ends of opposite truck frames together for relative pivotal movement in parallel vertical planes, a sprocket driving wheel for each track mechanism journaled on the main frame, thrust links extending forwardly and downwardly from journal bearings of the sprocket wheels to said stabilizer shaft and a draw bar connected to said thrust links for the purpose stated.

2. In a traction engine, a main frame, a pair of track units at the opposite sides of said main frame, said units comprising chain sprockets, idler wheels, roller truck frames and chain tracks encompassing said members, a stabilizer shaft connecting the rear ends of the truck frames for relative pivotal movement in parallel vertical planes, means for yieldably supporting the main frame from said truck frames, an equalizer member for pivotally connecting the forward ends of the truck frames to the main frame, thrust rods pivotally connecting the rear ends of the truck frames with the main frame, and a draw bar, pivotally connected to intermediate portions of the thrust links for the purpose stated.

3. In a traction engine, a main frame, a pair of track units at the opposite sides of said main frame, said units comprising chain sprockets, idler wheels, roller truck frames and chain tracks encompassing said members, a stabilizer shaft connecting the rear ends of the truck frames for relative pivotal movement in parallel vertical planes, means for yieldably supporting the main frame from said truck frames, an equalizer member for pivotally connecting the forward ends of the truck frames to the main frame, thrust rods pivotally connecting the rear ends of the truck frames with the main frame and a draw bar connected to said thrust rods, whereby a pull thereupon will exert downward pressure upon the truck frames.

4. In a tractor construction, a main frame, a transverse beam across and beneath the rear thereof, a transverse equalizer bar across the forward end thereof and pivoted centrally along the longitudinal center of the main frame, a stabilizer shaft disposed beneath the cross beam and parallel thereto, roller truck frames pivotally connected at their rear ends to the stabilizer shaft and at their forward ends to the equalizer bar for independent vertical movement, means for permitting limited movement of the stabilizer shaft in relation to the cross beam, vertically and longitudinally in relation to the main frame while preventing lateral movement in relation thereto, compression springs interposed between the rear ends of the truck frames and the cross beam of the main frame and thrust rods pivotally connected to the main frame at their rearward ends and to the truck frames at their forward ends, said second named connections being lower than the first named connections, whereby downward pressure upon the main frame will act to force the truck frames downwardly and a draw bar connected with both of said thrust rods at a point between their pivotal centers, whereby a pull exerted thereupon will act to swing the forward ends of the thrust links downwardly and thus exert a downward vertical pressure upon the rear ends of the truck frames.

5. A vehicle frame comprising side rails, a transverse beam rigidly uniting these rails at their rear ends and a radiator for an internal combustion engine, interposed between the forward ends of said rails and providing means for rigidly holding said rails in parallel spaced relation to each other, roller truck frames disposed at the opposite sides of said main frame, a resilient equalizer bar pivotally connected at its opposite ends to the forward ends of said truck frames and centrally pivoted to said radiator structure, yieldable connections between the rear ends of the truck frames and the main frame and thrust rods pivotally connecting the rear ends of the truck frames with the main frame, whereby downward motion of the main frame will act to positively impart downward motion through the thrust rods to the truck frames.

6. A vehicle frame comprising side rails, a transverse beam rigidly uniting these rails at their rear ends and a radiator for an internal combustion engine, interposed between the forward ends of said rails and providing means for rigidly holding said rails in parallel spaced relation to each other, roller truck frames disposed at the opposite sides of said main frame, a resilient equalizer bar pivotally connected at its opposite ends to the forward ends of said truck frames and centrally pivoted to said radiator structure, yieldable connections between the rear ends of the truck frames and the main frame, thrust rods pivotally connecting the rear ends of the truck frames with the main frame, whereby downward motion of the main frame will act to positively impart downward motion through the thrust rods to the truck frames and means embodied in the radiator construction for applying weight at the forward ends of the truck frames to coöperate with the pressure exerted through the thrust rods to equally distribute the carrying load upon the truck frames.

7. A vehicle frame comprising side rails, a transverse beam rigidly uniting these rails at their rear ends and a radiator for an internal combustion engine, interposed between the forward ends of said rails and providing means for rigidly holding said rails in parallel spaced relation to each other, roller truck frames disposed at the opposite sides of said main frame, a resilient equalizer bar pivotally connected at its opposite ends to the forward ends of said truck frames and centrally pivoted to said radiator structure, yieldable connections between the rear ends of the truck frames and the main frame and thrust rods pivotally connecting the rear ends of the truck frames with the main frame, whereby downward motion of the main frame will act to positively impart downward motion through the thrust rods to the truck frames and means embodied in the radiator construction for applying weight at the forward ends of the truck frames to coöperate with the pressure exerted through the thrust rods to equally distribute the carrying load upon the truck frames and a draw bar connected with the thrust rods whereby a load thereupon will act to exert additional pressure to the truck frames through said thrust rods.

8. In a tractor construction, a main frame, self-laying track units at the opposite sides of said main frame, said units comprising sprockets rotating from a fixed axis upon the main frame, roller truck frames yieldably mounted in relation to the main frame, idler sprockets carried by the forward ends of said truck frames, chain tracks encompassing said sprockets, wheels and truck frame and supporting means for the upper run of said chain pivotally mounted at its rear end to the main frame and yieldably supported at its forward end to the truck frame.

In testimony whereof I have hereunto set my hand in the presence of two subscribing witnesses.

ELMER E. WICKERSHAM.

Witnesses:
  F. W. TARR,
  F. A. WEAVER.